(12) United States Patent
Silverstein (10) Patent No.: US 9,846,041 B2
(45) Date of Patent: Dec. 19, 2017

(54) TIME REGULATED NAVIGATION OF TRAVEL THROUGH AN AIRPORT

(71) Applicant: OneMarket Network LLC, San Francisco, CA (US)

(72) Inventor: Dana Lu Silverstein, Dublin, CA (US)

(73) Assignee: OneMarket Network LLC, San Francisco, CA (US)

(*) Notice: Subject to any disclaimer, the term of this patent is extended or adjusted under 35 U.S.C. 154(b) by 8 days.

(21) Appl. No.: 14/887,748

(22) Filed: Oct. 20, 2015

(65) Prior Publication Data

US 2017/0108339 A1    Apr. 20, 2017

(51) Int. Cl.
| | |
|---|---|
| *G01C 21/20* | (2006.01) |
| *H04W 4/02* | (2009.01) |
| *H04W 4/04* | (2009.01) |
| *G01S 5/00* | (2006.01) |

(52) U.S. Cl.
CPC .......... *G01C 21/206* (2013.01); *G01S 5/0054* (2013.01); *H04W 4/026* (2013.01); *H04W 4/028* (2013.01); *H04W 4/043* (2013.01)

(58) Field of Classification Search
None
See application file for complete search history.

(56) References Cited

U.S. PATENT DOCUMENTS

| | | | | |
|---|---|---|---|---|
| 8,320,939 B1* | 11/2012 | Vincent | ................... | G01S 19/48 370/338 |
| 8,700,250 B1* | 4/2014 | Curtis | ................ | G01C 21/206 701/25 |
| 8,773,946 B2* | 7/2014 | Padmanabhan | ........ | G01C 15/00 367/7 |
| 2002/0154174 A1* | 10/2002 | Redlich | ............. | G06F 17/30873 715/848 |
| 2006/0059024 A1* | 3/2006 | Bailey | .................... | G06Q 10/02 705/5 |
| 2009/0240517 A1* | 9/2009 | Pelter | .................... | G06Q 50/14 705/306 |
| 2011/0080848 A1* | 4/2011 | Khorashadi | ............ | G01C 21/20 370/254 |
| 2011/0082638 A1* | 4/2011 | Khorashadi | ............ | G01C 21/20 701/532 |

(Continued)

OTHER PUBLICATIONS

AirPatrol Cell Phone Tracking Technology http://airpatrolcorp.com/, Sep. 21, 2015, retrieved on Nov. 9, 2015, pp. 1-3.

(Continued)

*Primary Examiner* — Russell Frejd
(74) *Attorney, Agent, or Firm* — Kwan & Olynick LLP (57) ABSTRACT

A mobile device providing time regulated navigational guidance for travel to a flight gate in an airport terminal, based on the time for boarding the flight, the preferences of the traveler, estimated transit times on various segments of a route to the gate from a starting point of the travel (or the current location of the mobile device) involving different transportation modalities, and wait times at various queues in the airport. Notifications and/or reminders are provided according to the time estimates to guide the travel for timely travel to the gate and optionally recommend points of interest on the way to the gate within the time constraint.

21 Claims, 4 Drawing Sheets

(56) References Cited

U.S. PATENT DOCUMENTS

| | | | |
|---|---|---|---|
| 2011/0172906 A1* | 7/2011 | Das | G01C 21/20 701/533 |
| 2012/0029817 A1* | 2/2012 | Khorashadi | G01C 21/20 701/451 |
| 2012/0044265 A1* | 2/2012 | Khorashadi | G01C 21/206 345/641 |
| 2012/0173204 A1* | 7/2012 | Padmanabhan | G01C 15/00 703/1 |
| 2013/0053056 A1* | 2/2013 | Aggarwal | G01S 5/0263 455/456.1 |
| 2015/0154643 A1* | 6/2015 | Artman | G06F 17/3087 705/14.66 |
| 2016/0178376 A1* | 6/2016 | Moore | G08G 1/14 701/532 |

OTHER PUBLICATIONS

Lavi Queue Metrics http://qtrac.lavi.com/people-counting/, Sep. 10, 2015, retrieved on Nov. 9, 2015, pp. 1-8.
QMetrix Cameras http://www.qmetrix.com/sensors/queue-waiting-time-sensors/, Feb. 23, 2015, retrieved on Nov. 9, 2015, pp. 1-2.
TSA Wait Times https://apps.tsa.dhs.gov/mytsa/wait_times_home.aspx, Sep. 5, 2015, retrieved on Nov. 9, 2015, 1 page.
Using Google Maps API to get travel time data, http://stackoverflow.com/questions/1042885/using-google-maps-api-to-get-travel-time-data, last edited on Apr. 18, 2015, retrieved on Oct. 28, 2015, pp. 1-2.

* cited by examiner

TIME REGULATED NAVIGATION OF TRAVEL THROUGH AN AIRPORT

FIELD OF THE TECHNOLOGY

At least some embodiments disclosed herein relate to the time sensitive navigation of travel to and through an airport using location determination devices, sensors related to traffic conditions, and mobile devices providing user interfaces for the navigation operations.

BACKGROUND

There are map applications configured to compute a route for traveling from a location to another location. For example, after a user specifies a starting point and a destination, a map application typically computes a route of road segments from the starting point to the destination and presents the route on a map. Based on the current location of the map-based navigation device in which the map application is running, the map application may provide turn by turn navigation instructions to assist the driver in following the route to the destination.

Some of the map applications may estimate the arrival time based on the computed route. The arrival time may be based on the current speed of travel and/or the real time traffic conditions. For example, in some systems, mobile phones moving on roads determine their speeds and/or locations as a function time and report the speed/location data to a centralized server, which determines the traffic conditions of the respective roads based on the reports received from the mobile phones. The traffic conditions may be presented on the map application and/or used to estimate the arrival time at the destination following the computed route.

Such map applications are helpful, but generally insufficient to meet the navigation needs of a traveler scheduled to board a flight scheduled to take off at a predetermined time.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Air travelers are typically stressed out about time. The fear of missing their flight leaves travelers worried, which drives a decision to get to their airport terminal gate sooner than later. Early arrival at the airport terminal gate may lead to the waste of time.

One embodiment disclosed herein provides a tool and/or mobile device that can assemble map data and real time traffic and delay information and provide a time regulated navigation guidance to a traveler such that the traveler may arrive at the airport terminal gate in time and optionally visit points of interest during the travel to the airport terminal gate. The tool informs the traveler when to leave and/or adjust the travel plan according to traffic conditions to match the arrival time with the takeoff/boarding time for the booked flight. Thus, the time of the traveler can be best utilized with reduced stress levels. The tool and/or mobile device can therefore provide a personal travel concierge.

In one embodiment, the tool is configured to piece together the time it will take to get to the airport terminal gate in order to avoid missing the booked flight. The tool uses a centralized server to gather relevant information from various sources, such as airline websites, posted messages from the airline and/or the airport, flight leader boards, and the airport information system. The system further monitors the traffic conditions in various parts of the airport that may cause delays, such as luggage check-in, security screening, parking, airport ground transportation system, etc. The tool also considers the personal preferences (e.g., I like to be at the gate 30 minutes before boarding). The tool combines the real time traffic information and the user preferences to provide time regulated navigation guidance to make the travel less arduous and stressful.

For example, the tool is configured to use a website, an API or a mobile application of an airline carrier, or a website of an airport to track the status of the booked flight. The booked flight may be delayed, and/or changed to a different airport terminal gate for boarding, which can affect the time based navigation instructions provided by the tool.

For example, the tool is integrated with a map application of the airport to provide navigation instructions for travel within the airport. The tool uses real time traffic condition data in the airport to determine the real time delays at various chock points within the airport, such as luggage check-in, security screening, parking, airport ground transportation between parking structure to terminals, between terminals, and/or traffic delay at the drop-off areas at departure terminals, etc. Based on the real time information, the tool computes the optimal time to leave home or work or the current location of the traveler, considering personal preferences such as how long in advance of boarding the traveler prefer to arrive at the gate.

Figure 1:
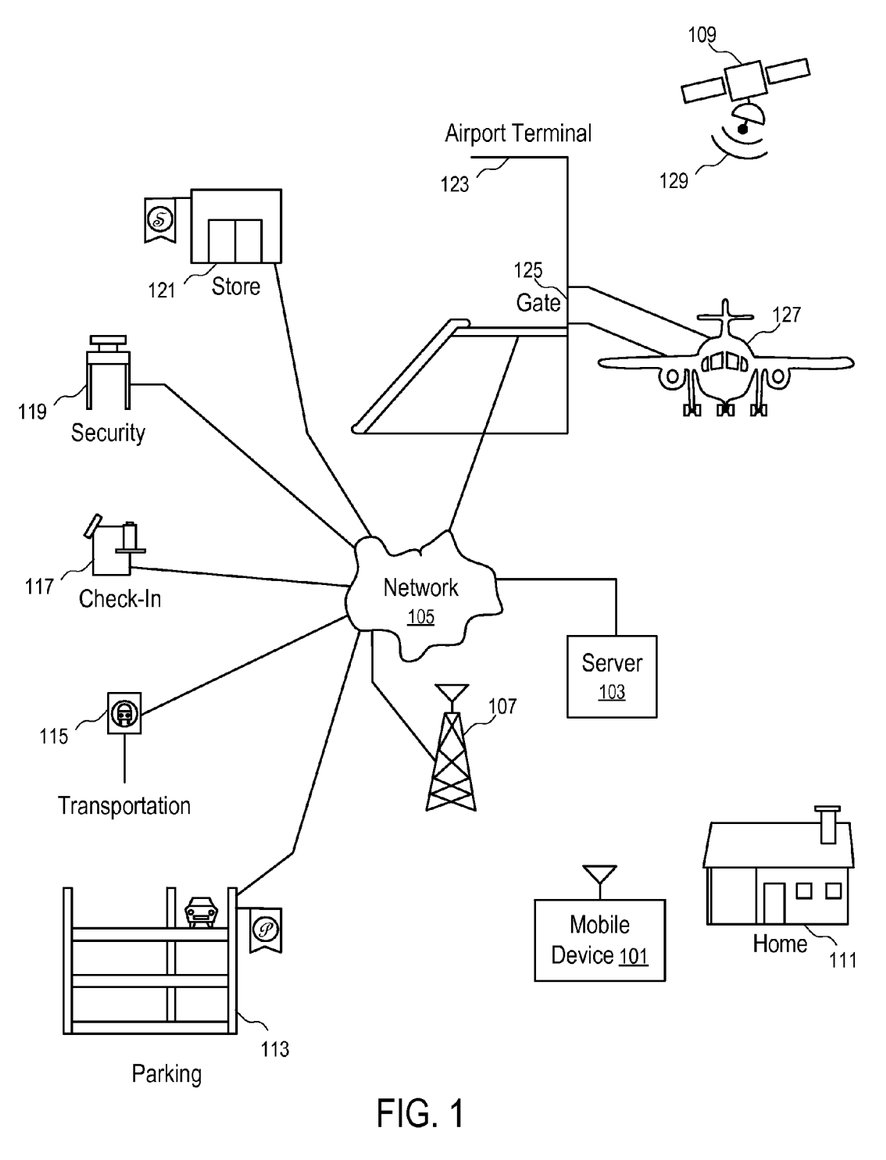
FIG. 1 illustrates a system configured to provide time regulated navigation of travel through an airport according to one embodiment.

In one embodiment, a centralized server is configured as a digital platform that manages real time data related to the journey of the traveler on the day of traveler from a starting location (e.g., home, work, or a current location) to the airport terminal gate. Through a mobile application running in a mobile device of the traveler, the system informs the traveler of how much time they have remaining based on the preferences of the traveler's, where the traveler is currently located, the estimated time it will take the traveler to get to the gate, and recommendations for activities at the airport. For example, if the system calculates that the traveler has an estimated time of arrival at the gate (125) that is more than a predetermined period of time (e.g., 90-minutes) ahead of the required time of arrival for the flight departure time, based on the current location of the traveler/mobile device (101), the system is configured to recommend things to do based on this time and location, such as a visit to the store (121) or another point of interest within or near the airport.

The mobile application helps the traveler plan the trip from a single interface and single platform.

In one embodiment, the mobile application provides time regulated navigation instructions based on the current location of the mobile device, the traffic conditions, and map data of the road system between the current location of the mobile device and the airport, and the map of ground transportation system and transport corridors within the airport, and the expected delays within the airport.

For example, after the traveler books a flight via the mobile application or identifies the booked flight to the mobile application, the traveler may set and/or adjust his preferences in the mobile application. The preferences may be communicated from the mobile application to the centralized server for storage.

For example, a traveler may specify a preference to arrive 30 min before boarding, travel with family (which may cause the system to add 45 min to travel time based on interviews with customers traveling with children or statistic data of tracking travelers with children). The traveler may indicate whether the traveler plans to check in luggage, a preference for parking (e.g., cheapest), an authorization to provide notification with text message, and a preference for the reminder time of the notification (e.g., 15 min before the traveler needs to leave).

For example, on the day of travel, the system determines that the flight of the traveler is scheduled at 3:15 pm today and has a boarding period starting at 2:45 pm. The platform and/or the mobile application determines that 150 min of time is needed to for the travel to the gate, including:

+45 min drive to the airport based on the traveler's mobile device;

+45 min Family prep time;

+5 min average checked luggage time;

+25 min from cheapest parking lot to the terminal including shuttle time; and

+30 min preferred arrival time before boarding.

For example, at 12:00 pm, the system calculates that 12:30 pm is an ideal time to leave and start the travel to the airport (e.g., based on 2:45 pm minus 150 min). Thus, the mobile application is configured to display a green bar at 12:15 pm, indicating that the traveler is still within the time budget.

Since the user may not be using the mobile application at the time, the system is configured to notify the traveler via a push notification that the traveler needs to leave in 15 min, or via an alarm set in the mobile application to provide the notification.

After the traveler waits 20 minutes to get moving, the user interface of the mobile application changes to orange and notifies the traveler (e.g., via a push notification or an alarm set in the mobile application) that they might want to head out to the airport or they will be late.

In one embodiment, the mobile application may suggest that to save time the traveler can pre-order food from a food operator at the airport for delivery to the gate area. The traveler agrees via the user interface of the mobile application and purchases food in advance. The mobile application requests if it is ok to adjust the preference from arriving 30 minutes before boarding down to 15 minutes. The traveler agrees and the user interface of the mobile application acknowledges and turns green.

In one embodiment, the mobile application learns this behavior and adjusts the preferences such that the next time it notifies the traveler that it is time to go, it also asks whether the traveler would like to pre-order their food to save time.

In one embodiment, when the current travel arrangement is expected to cause the travel to be late for the flight, the mobile application may compute an alternative arrangement, such as adjusting a parking arrangement, adjusting a mode and/or route of travel within the airport, etc.

In one embodiment, the time durations obtained to guide the user to travel in a timely manner to the airport terminal gate includes, but not limited to, personal preferences, driving times, and airport wait times. Personal preferences (e.g., the preferred time of arrival at the gate before boarding starts, the reminder time period before the user needs to start the travel to the airport) may be entered and/or adjusted by the user via a user interface of the mobile application and/or predicted by the system based on historical user input.

In one embodiment, the driving times can be obtained from a maps API that is generally configured to estimate the driving times from point A to point B on a road system. Alternatively, the system may include the map function of computing a driving route from point A to point B on a road system to provide the turn by turn navigation and the estimate of the driving time.

In one embodiment, the centralized server obtains various queue times at an airport (e.g., Check-in, TSA Security, Concessions) using one or more of queue monitoring or tracking technologies. For example, in one embodiment, the delay time of a queue is obtained via the tracking and/or monitoring of signals from cell phones (e.g., Cellular, WiFi, Bluetooth signals transmitted by the cell phones and moved through the queue). In another embodiment, devices for detecting passenger motion are used to monitor the queue and its delay time. In a further embodiment, a camera is used to capture an image of a queue, detect the number of persons in the queue from the image and/or the progressive change of the queue as a function of time, and compute the delay time of the queue. In a further embodiment, the queue delay time is obtained from a website or a mobile application of an operator of the queue (e.g., TSA, or the airline).

Thus, the mobile application provides the management of time for complete trip from a starting location (e.g., home, work, or a current location) to the airport terminal gate for the flight, based on the current location of the mobile device of a traveler and the personal preferences of the traveler. In one embodiment, the mobile application provides color coded notifications to provide time based navigation guidance for the travel to the gate, especially when the user is not actively using the mobile application before the travel or during breaks in the travel (e.g., visiting a point of interest on the way to the gate, within the airport). The mobile application allows the user to set a reminder period for the notifications such that the activities of the user can be better managed. Based on the time remaining, the current location of the mobile device, the preferences of the traveler, and the real time traffic/queue conditions, the mobile application may recommend visits to points of interest, adjustments to travel arrangement (e.g., parking, drop-off location at the airport, mode of transportation, transport corridor within the airport, pre-order for delivery, electronic check-in with airline).

In one embodiment, the system is configured to determine the time required to gate by adding the preference time allotments, the estimated transit times (e.g., walk, ride, drive), and wait times (e.g., check-in with airline, airport security screening).

The preference time allotments are obtained as inputs from the traveler through a user interface of the mobile application (or predicted based on past interaction with the traveler or similar travelers). Examples of preference time allotments include, but not limited to:

Transportation type to airport;
Type of Parking (offsite, onsite);
Baggage Check-in (yes/no);
Traveling with kids (yes/no);
Traveling with colleagues (yes/no);
Arrive at the gate X minutes before boarding;
Transportation Security Administration (TSA) Pre-check/Global Entry (yes/no); and
Picking up goods or services (type of good/service and location).

In one embodiment, when the time to boarding minus the estimated time to the gate is greater than a threshold (e.g., 15 minutes), the mobile user interface shows green; when the time to boarding minus the time to gate is between 0 and the threshold (e.g., 15 minutes), the mobile user interface shows yellow or orange; and when the time to boarding is less than the time to gate, the mobile user interface shows red.

FIG. 1 illustrates a system configured to provide time regulated navigation of travel through an airport according to one embodiment.

In FIG. 1, a mobile device (101) is configured to provide a user interface to guide the user for a trip from a predetermined location, such as the home (111), or the current location of the mobile device (101) to the gate (125) in the airport terminal (123) to board the aircraft (127) for a booked flight in a timely manner.

In FIG. 1, the mobile device (101) has a location determination unit (101) to compute the current location of the mobile device (101) (e.g., using a GPS receiver to compute the coordinates of the mobile device (101) on the earth based on the GPS signals (129) transmitted from a plurality of GPS satellites (e.g., 109)).

In some embodiments, the mobile device (101) determines a location of the mobile device using cellular communication signals, or via other location determination techniques.

In FIG. 1, the mobile device (101) is configured to have a communication connection to a server (103) via a wireless communications access point (107), such as a cellular communications base station, or a wireless local area network access point.

The mobile device (101) is configured with a user interface to receive user preferences regarding the trip to the gate (125), such as the transportation modality for the travel to the airport via a road system, the need for a parking space, the preference regarding the parking space, etc. The preferences are used to determine the time periods required to go through various key locations (e.g., parking lot (113), end point (115) of transportation to the airport, the check-in location (117) with the airline, the security screening point (119), etc.) in the airport to reach the gate (125).

In one embodiment, some of the key locations in the airport may have queues that require wait times for the traveler to go through. The system as illustrated in FIG. 1 includes sensors and/or data collection systems at the key locations to determine the current wait times at the corresponding locations.

For example, an airline may monitor the wait time at the check-in location (117) and provide the information to the server (103) via an application programming interface, a web service, or to the mobile device (101) via a mobile application.

For example, the airport of one embodiment is configured with motion sensors or cameras to detect the status of the queues at key locations to provide the estimated wait times at the key locations, such as the security screening point (119), the parking lot (113), etc.

The server (103) is configured to communicate over the network (105) to collect the information related to the wait times at the key locations in the airport.

In one embodiment, the server (103) is configured with a map service to compute a route from the current location of the mobile device (101) to the ground transportation end point in the airport, such as the drop-off location (115) or the parking lot (113). The transit time on the route is estimated (e.g., based on the traffic conditions reported from mobile devices on the road system). In some embodiments, the server (103) is configured to communicate with a separate map server using a web service or application programming interface to obtain the route and the estimated transit time. In other embodiments, the mobile device (101) is configured to obtain the route and the estimated transit time from the separate map server.

Based on the time constraint of the flight, the user preferences, the transit time on the road to the airport, the transit time from key locations to the gate, and the wait times at various key locations in the airport, the mobile device (101) and/or the server (103) computes the time-based navigational guidance for the timely trip to the gate (125) and optionally suggest the visit of points of interest (e.g., 121) on the way to the gate (125) when time permits.

Figure 2:
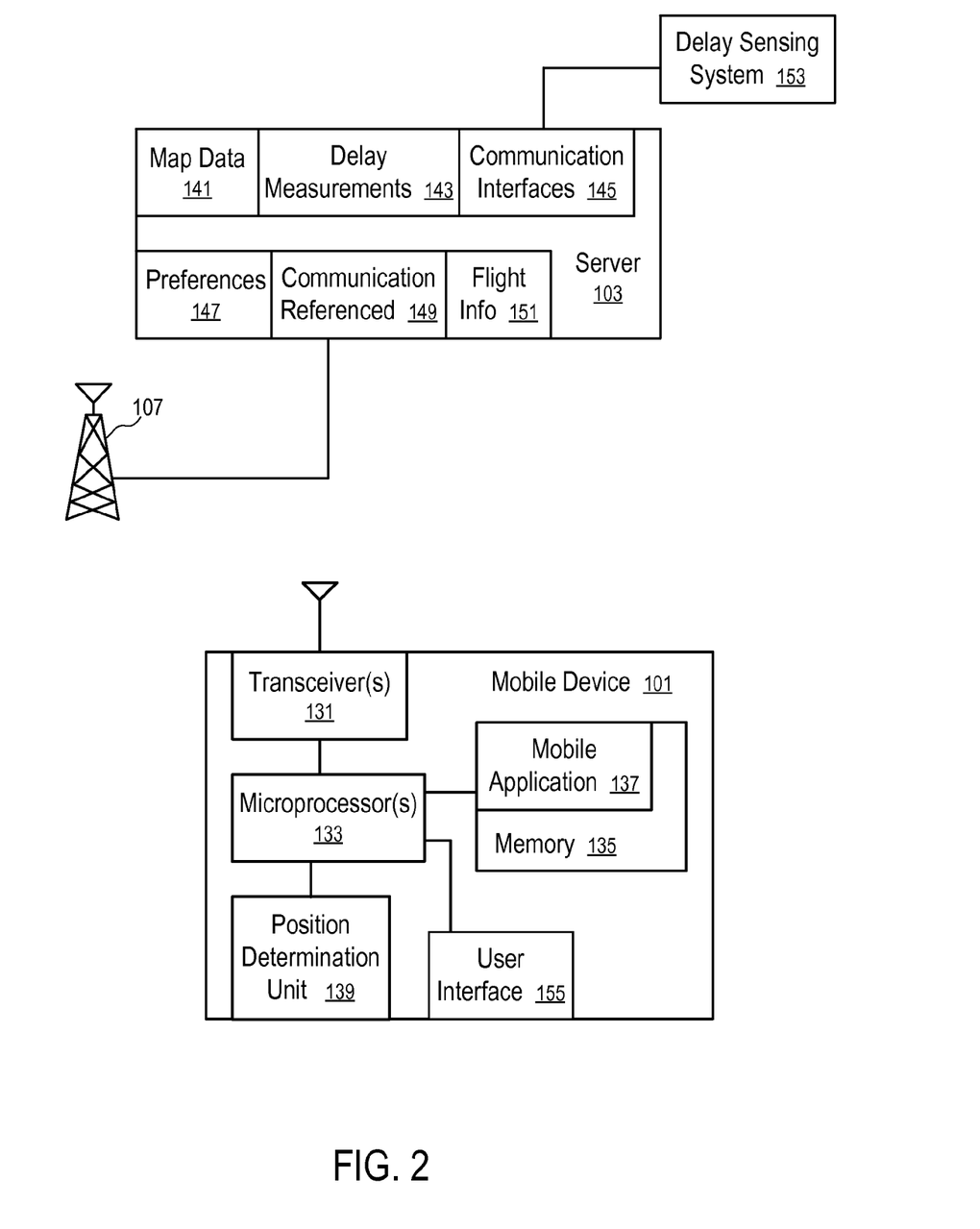
FIG. 2 illustrates a mobile application implementation of time regulated navigation according to one embodiment.

FIG. 2 illustrates a mobile application implementation of time regulated navigation according to one embodiment.

In FIG. 2, the mobile device (101) is configured with a transceiver (131) to communicate with the server (103) via an access point (107) (e.g., the base station of a cellular communications network, or a wireless route for an location area network).

In FIG. 2, the mobile device (101) is configured with a position determination unit (139) that computes the current position of the mobile device (101) from satellite or ground-based positioning system signals (e.g., GPS signal (129)) or cellular communications signals.

In FIG. 2, the mobile device (101) has a mobile application (137) stored in the memory (135) and executed by the microprocessor(s) (133) to provide the time-based navigational guidance on the user interface (155). The navigational guidance is provided based on the time for boarding the flight at the gate (125) and the time period estimated for the travel from the current location of the mobile device (101) to the gate (125).

In one embodiment, the navigational guidance prompts the user of the mobile device (101) to start the travel on a segment of the trip from the current location, such as taking a ride or driving a car to the airport, checking in with the airline, passing the security checkpoint, leaving an optional point of interest (121), or heading to the gate (125) at the boarding area for the flight. Different segments of the trip to the gate (125) may use different transportation modalities and/or different transportation systems.

In one embodiment, the mobile application computes and updates the estimated time of arrival at the gate (125) based on the current location of the mobile device (101) and real time traffic information and wait time at the airport queues. The estimated time of arrival at the gate (125) is compared with the scheduled time for boarding at the gate to provide the navigational guidance (e.g., within a reminder time period).

For example, if the mobile application (101) determines that the mobile device is already on the road to the airport and the time estimated time of arrival at the gate (125) is more than a predetermined time period before the time of boarding, the mobile application (101) may skip a reminder for prompting the user to start the trip to the airport.

However, if the time estimated time of arrival at the gate (125) is less than a predetermined time period before the time of boarding, the mobile application (101) provides an alert, alarm, or reminder on the user interface (155), prompting the user to start the trip with a suggested route.

In some embodiments, when it is estimated that the user will be late for the flight using the preferred transportation mode (e.g., driving a car to an offsite parking lot at the airport, or using a public transportation system), the mobile application (101) is configured to suggest an alternative mode of transportation (e.g., obtaining a ride via taxi or a friend).

In FIG. 2, the server (103) is configured to configured to provide a centralized location to provide resources for the navigational guidance.

For example, the server (103) stores the map data (141) for the navigation outside the airport in a road system and/or for the navigation inside the airport to the gate (125).

The server (103) includes communication interfaces (145) to communicate with one or more delay sensing system (153) and the mobile devices (e.g., 139).

For example, the delay sensing system (153) may include the motion sensors, cameras, or mobile phone signal sensors to measure the delay at various queues in the airport, such as check-in (117), security (119), store (121), etc. The queues may include time periods for product preparation. For example, if the traveler wants to order food on the way to the gate (125), the system calculates/adds the food preparation time to the expected time period to the gate (125). For example, if the traveler has pre-ordered a 45-minute massage, the system calculates/adds this time into the journey to the gate (125).

For example, the delay sensing system (153) may include a map service platform that tracks the movement of mobile phones on a road system to determine the speeds of traffic flows on various segments of the road system.

The server (103) stores the delay measurements (143) for the determination of the time period required to travel to the gate (125).

In FIG. 2, the server (103) also stores and updates the flight information (151), such as the gates of boarding for various flights, the staring times of boarding of the flights, the flights booked by the users of the mobile devices (e.g., 101), etc.

In FIG. 2, the server (103) stores the preferences (147) of the users and the communication references (149) for the mobile devices (101) running the mobile application (137). The communication references (149) for the mobile devices allows the server (103) to initiate a communication with the mobile device (101) and/or the mobile application (137) at a time the user is required to take an action for timely arrival at the gate (125) for boarding the flight of the user.

For example, the mobile device (101) includes a mobile phone; and the communication reference (149) includes a mobile phone number to which a text message can be sent to the mobile device (101), in accordance with the preferences (147), as an alert that causes the mobile application (137) to be used to present detailed navigational guidance.

In some embodiments, the navigational guidance is provided with a browser running in the mobile device (101) and visiting the server (103).

In one embodiment, the server (103) aggregates 3rd party data feeds (e.g. flight data, TSA wait times, food/product preparation times). The server (103) communicates relevant parts of 3rd party times to the mobile application (137) through an application programming interface (API). The server (103) stores user preferences (147) and provides recommendations of points of interests (121) through an API (same on as above ii) and/or the navigational alerts.

The mobile application (137) is configured to calculate and update the amount of time to get to the gate (125) based the current location of the mobile device (101) and the data provided by the server (103) via the API. The mobile application (137) provides the user interface (155) to gather input on user preferences (147) and communicate the user preferences (147) to the server (103).

In one embodiment, the mobile application (137) and/or the server (103) is configured to re-compute the estimated time of arrival at the gate (125) in response to: a) flight status change (e.g., delayed, now boarding, on-time, canceled); b) geo-location change (e.g., the mobile device (101) moves from point A to point B); c) elapsed time (e.g., time changes from 12:41 p to 12:42 p); and d) an order is ready for pick up or is out for delivery. The mobile application (137) presents the estimated time of arrival in relation with the scheduled boarding time of the flight. When the estimated time of arrival in relation is with a predetermined threshold within the scheduled boarding time of the flight, the mobile application (137) and/or the server (103) provides the alert for action and/or the navigational guidance for the next action.

Figure 3:
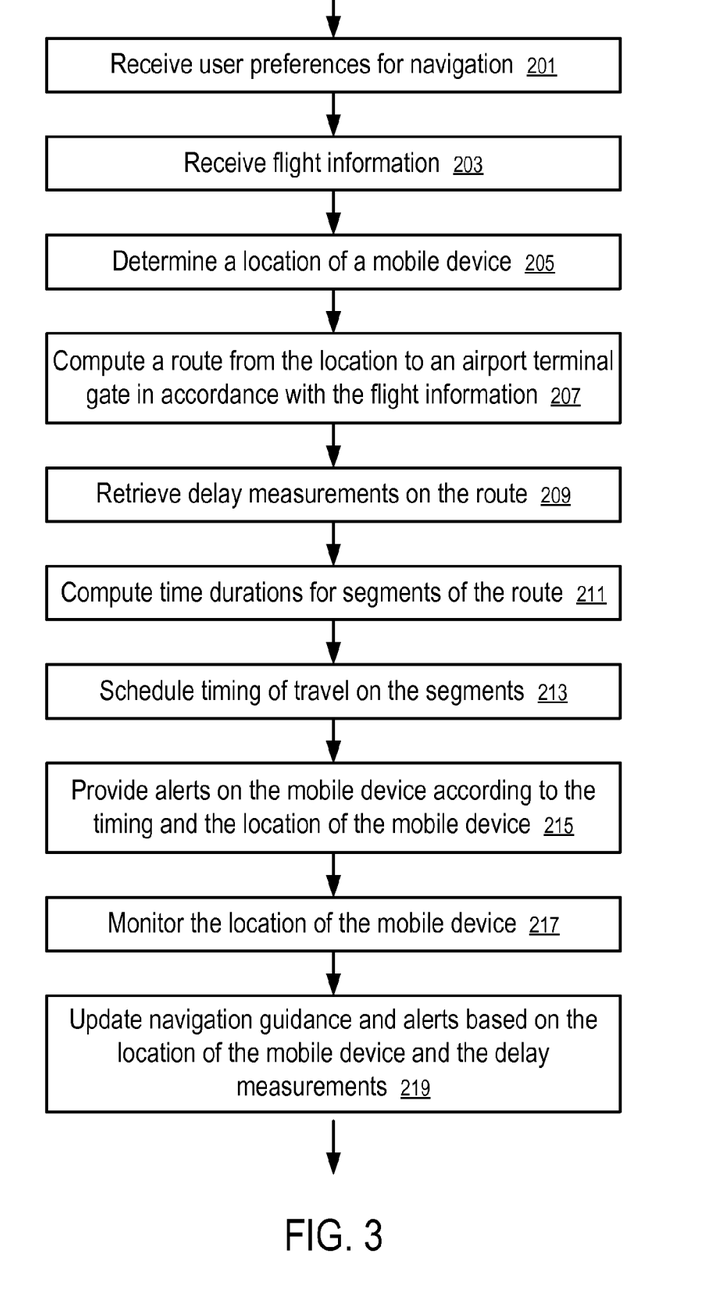
FIG. 3 shows a method to provide time regulated navigation according to one embodiment.

FIG. 3 shows a method to provide time regulated navigation according to one embodiment. For example, the method of FIG. 3 can be implemented using the mobile device (101) and the server (103) illustrated in FIGS. 1 and 2.

In one embodiment, a computing system is configured to: receive (201) user preferences (147) for navigation; receive (203) flight information (151); determine (205) a location of a mobile device (101); compute (207) a route from the location to an airport terminal gate (125) for boarding a flight in accordance with the flight information (151); retrieve (209) delay measurements (143) on the route; compute (211) time durations for segments of the route; schedule (213) timing of travel on the segments; provide (215) alerts on the mobile device (101) according to the timing and the location of the mobile device (101); monitor (217) the location of the mobile device (101); and update (219) navigation guidance and alerts based on the location of the mobile device and the delay measurements.

Figure 4:
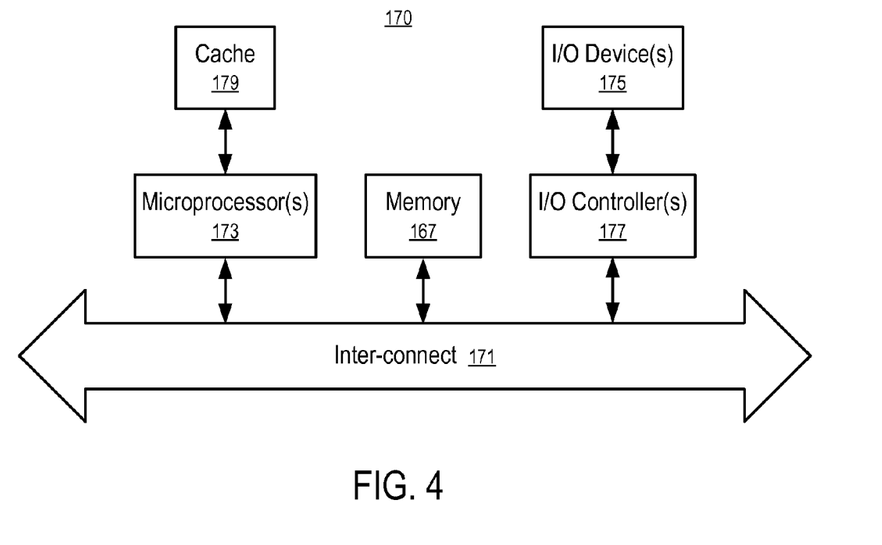
FIG. 4 shows a data processing system that can be used to implement some components of a system according to one embodiment.

FIG. 4 shows a data processing system that can be used to implement some components of a system according to one embodiment.

FIG. 4 shows a data processing system that can be used to implement some components of a robotic system according to one embodiment. For example, the data processing system of FIG. 4 can be used to implement each of the controller of the robot (101), the dock station (137), the server (139), and/or the database (141) discussed above.

While FIG. 4 illustrates various components of a computer system, it is not intended to represent any particular architecture or manner of interconnecting the components. One embodiment may use other systems that have fewer or more components than those shown in FIG. 4.

In FIG. 4, the data processing system (170) includes an inter-connect (171) (e.g., bus and system core logic), which interconnects a microprocessor(s) (173) and memory (167). The microprocessor (173) is coupled to cache memory (179) in the example of FIG. 4.

In one embodiment, the inter-connect (171) interconnects the microprocessor(s) (173) and the memory (167) together and also interconnects them to input/output (I/O) device(s)

(175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here. For example, the features described above in connection with "in one embodiment" or "in some embodiments" can be all optionally included in one implementation, except where the dependency of certain features on other features, as apparent from the description, may limit the options of excluding selected features from the implementation, and incompatibility of certain features with other features, as apparent from the description, may limit the options of including selected features together in the implementation.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A mobile apparatus, comprising:
a communication device;
a position determination unit;
an input/output device;
at least one microprocessor; and
a memory storing instructions configured as a mobile application executed by the at least one microprocessor;
wherein the mobile application is configured to provide via the input/output device a user interface to
receive input specifying a flight and preferences for a travel to boarding the flight, and
present navigational guidance for the travel based on a transit time of a route to a gate for boarding the flight in a terminal of the airport and a location of the mobile apparatus determined by the position determination unit;
wherein the mobile application is configured to use the communication device to communicate with a centralized server to
identify the route to the gate; and
estimate the transit time of the route based on real-time traffic condition information on roads of the route and real-time wait times at one or more predetermined queues in the airport to reach the gate;
wherein the mobile application is configured to compute times of actions for the travel, including a time to start traversing the route, based on the preferences, the flight, and the transit time, which is based on the real-time traffic condition information and the real-time wait times, and to provide via the user interface the navigational guidance according to the computed times of actions.

2. The mobile apparatus of claim 1, wherein the preferences specify an amount of time before boarding to arrive at a gate for boarding the flight in a terminal of the airport, and, the time to start is computed based also on the amount of time before boarding specified in the preferences, and the navigational guidance includes notification of the time to start.

3. The mobile apparatus of claim 2, wherein the preferences further include a specification as to whether traveling with children or other travelers, wherein the time to start is further based on statistical travel time for travelers who travelled with children or other travelers.

4. The mobile apparatus of claim 2, wherein the notification includes a reminder at a predetermined time period, which is also specified in the preferences, before the time to start the traversing the route.

5. The mobile apparatus of claim 2, wherein the times of actions also include a time for doing a recommended activity if the transit time is determined to result in arrival at the gate more than a predefined period of time before boarding, and wherein the navigational guidance includes notification of the recommended activity.

6. The mobile apparatus of claim 2, wherein the notification is received from the centralized server via a text message.

7. The mobile apparatus of claim 2, wherein the notification is generated using an alarm set by the mobile application on the mobile apparatus.

8. The mobile apparatus of claim 1, wherein the one or more predetermined queues include a queue for airport security screening.

9. The mobile apparatus of claim 1, wherein the one or more predetermined queues include a queue for check-in with an airline of the flight.

10. The mobile apparatus of claim 1, wherein a wait time for one of the one or more predetermined queues is determined via a camera capturing images of the queue and a server analyzing the images of the queue.

11. The mobile apparatus of claim 1, wherein a wait time for a respective queue of the one or more predetermined queues is determined via the centralized server communicating with a website of an operator of the respective queue.

12. The mobile apparatus of claim 1, wherein a wait time for a respective queue of the one or more predetermined queues is determined via passenger motion detectors installed to monitor the respective queue.

13. The mobile apparatus of claim 1, wherein a wait time for a respective queue of the one or more predetermined queues is determined via a cell phone tracking technology.

14. The mobile apparatus of claim 1, wherein the mobile application is configured to use an application programming interface of an online map application to determine an estimated transit time on a road system.

15. The mobile apparatus of claim 1, wherein the navigational guidance is color coded based on a difference between a remaining time period to the boarding of the flight and an estimated time to travel to the gate.

16. A non-transitory computer storage medium storing instructions configured as a mobile application, which when executed on a mobile apparatus having a communication device, a position determination unit, an input/output device, and at least one microprocessor, causes the mobile apparatus to perform a method, the method comprising:
providing via the input/output device a user interface to receive input specifying a flight and preferences for a travel to boarding the flight, and present navigational guidance for the travel based on a transit time of a route to a gate for boarding the flight in a terminal of the airport and a location of the mobile apparatus determined by the position determination unit;

communicating, using the communication device, with a centralized server to identify the route to the gate; and estimate the transit time of the route based on real-time traffic condition information on roads of the route and real-time wait times at one or more predetermined queues in the airport to reach the gate;

computing times of actions for the travel, including a time to start traversing the route, based on the preferences, the flight, and the transit time, which is based on the real-time traffic condition information and the real-time wait times; and providing, via the user interface, the navigational guidance according to the computed times of actions.

17. A server computer system, comprising:

at least one communication device;

at least one microprocessor; and a memory storing instructions executed by the at least one microprocessor to:

communicate using the at least one communication device with a plurality of queue monitoring systems to determine real time wait times at queues in an airport;

communicate with a mobile application running in a mobile apparatus to provide navigational guidance for a trip to a gate in a terminal of the airport for boarding a flight;

wherein the mobile application provides a user interface to receive input identifying the flight and preferences for a trip to the gate in the airport;

wherein the server communicates with the queue monitoring systems to determine real-time wait times at one or more predetermined queues in the airport to reach the gate;

wherein the mobile application communicates with an online map application to identify a route for the trip to the gate and estimate a transit time of the route based on real-time traffic condition information on roads of the route and the real-time wait times at the one or more predetermined queues; and wherein the mobile application is configured to provide via the user interface the navigational guidance according to times of actions, including a time to start traversing the route, computed for the trip based on the preferences and the transit time, which is based on the real-time traffic condition information and the real-time wait times.

18. The server computer of claim 17, wherein the preferences further include a specification as to whether traveling with children or other travelers, wherein the time to start is further based on statistical travel time for travelers who travelled with children or other travelers.

19. The server computer of claim 17, wherein the server is configured to transmit notification of the time to start to the mobile apparatus via a text message; and transmission of the notification is based on a current location of the mobile apparatus.

20. The server computer of claim 17, wherein the real-time wait times at the one or more predetermined queues includes a product preparation time for a product to be picked by a user of the mobile device on the trip to the gate in the airport.

21. The server computer of claim 17, wherein the navigational guidance includes providing a recommendation of a route through a point of interest if the transit time would result in arrival at the gate more than a predefined period of time before boarding.

* * * * *